May 27, 1924.

O. F. COLEMAN 1,495,549

MOTOR VEHICLE REGISTRATION AND IDENTIFICATION CERTIFICATE

Filed June 29, 1920

WITNESSES,

Perry G. Briney

Genevieve M. Hatert.

INVENTOR:
OSCAR F. COLEMAN
BY
R. S. Berry
ATTORNEY.

Patented May 27, 1924.

1,495,549

UNITED STATES PATENT OFFICE.

OSCAR F. COLEMAN, OF LOS ANGELES, CALIFORNIA, ASSIGNOR OF ONE-HALF TO G. E. GUILD, OF LOS ANGELES, CALIFORNIA.

MOTOR-VEHICLE REGISTRATION AND IDENTIFICATION CERTIFICATE.

Application filed June 29, 1920. Serial No. 392,614.

*To all whom it may concern:*

Be it known that I, OSCAR F. COLEMAN, a citizen of the United States, residing at Los Angeles, in the county of Los Angeles and State of California, have invented new and useful Improvements in Motor-Vehicle Registration and Identification Certificates, of which the following is a specification.

This invention relates to a certificate which is especially applicable for use in State or Government registration of motor vehicles and as a State certificate of license, and which is adapted to be employed for the purpose of instant identification of a vehicle and determination of its ownership.

It is the object of this invention to provide a means whereby recordation of a motor vehicle and of transfer of ownership thereof may be facilitated, and whereby the title to a vehicle may be readily traced and proven and the person owning same easily ascertained, so as to enable purchasers of used vehicles to verify previous and present ownership thereof and also enable the police authorities to determine the owner of the vehicle.

Another object is to provide a certificate of the above character which will serve to facilitate the legal transfer of a vehicle and enable the ready detection of attempted fraud and thereby render it impossible to transfer or sell stolen vehicles.

A further object is to provide a certificate of the above character which will serve as a record of the various data required by the State government and also as a record and receipt of payment of license fee to the State.

Another object is to provide a certificate which is unchangeable, that is, not capable of alteration.

Another object is to provide a certificate for the recordation and identification of motor vehicles which will also serve as a means for indicating judgment against the owner or driver of the vehicle identified in the certificate for violation of traffic ordinances.

Other objects will appear hereinafter.

The invention is illustrated in the accompanying drawings, in which:

Figure 1 is a view showing the obverse face of the certificate.

Figure 2 is a view showing the reverse face thereof.

In carrying out my invention I employ a sheet of any suitable material, preferably consisting of chemically prepared paper such as is commercially known as "bankers safety paper," but any material may be used which will show evidence of changes, erasures, or alterations. This sheet or strip is divided into a series of fields or areas designated by the reference numerals 5, 6, 7, 8, 9, 10 and 11; the fields 5 and 6 being separated by a scored or perforated line 12 to permit the portion 5 being detached, and the portions 6, 7, 8, 9, 10, and 11 being separated by fold lines 13, 14, 15, 16 and 17 along which the strip may be folded into a compact package. The portions of the strip between the fold lines are preferably of corresponding dimensions, so that the various folds will be uniform in size and capable of being folded to be positioned back of the portion 6. The portions 9, 10 and 11 constitute coupons and are designed to be separated from each other and from the remainder of the certificate, and to permit such separation the fold lines 15, 16 and 17 are preferably scored or perforated. The portion 6 constitutes an identification and license card and for which purpose it is provided with a series of blanks for filling in with the data ordinarily required by State identification bureaus, which data is here shown as embodying the character of the vehicles, such as an automobile, its make, model, engine number, frame number, type, number of engine cylinder, bore, year model, date issued, registered horse power, and amount of license fee paid, together with a license number to correspond with the license number plates to be carried on the vehicle, and including the name and address of the first registered owner as designated by the certificate, and which card is also provided with space to receive the signature of such registered owner together with his address and also the name of the person in whom the title of the vehicle is vested hereinafter designated as the legal owner; this portion of the certificate being designed to be kept posted in plain view at a convenient point in the vehicle at all times with the remaining portions of the certificate excepting the portion 5 folded against the back thereof. The data as to the engine number and frame number by which all motor vehicles are identified are preferably perforated in the card 6 as well as inscribed thereon in indelible inks, but other of the data may be perforated if desired, however, the data may be placed on the card in any desired manner but preferably in such manner as to inhibit change or alteration without defacing the certificate or showing evidence of such change or alteration. The reverse face of the portion 5 is provided with blanks to receive the data corresponding to that of the card 6, as shown in Figure 2, except that the space for signature of the registered owner and his address together with the name of the legal owner may be omitted if desired; the portion 5 constituting a coupon which is a duplicate of the card 6 and which is designed to be detached along the line 12 and filed with the State registration and license bureau to serve as a permanent record in that bureau.

The portions 7 and 8 are designed to remain at all times a part of the card 6, that is, are not intended to be separated therefrom, and constitute a record of subsequent transfers of the vehicle to accompany the certificate and serve as a means of identification of buyer and seller of the vehicle by their signatures, for which purpose each of the portions 7 and 8 is provided with a series of blanks to indicate any desired number of transfers here shown as three in number and designated as "1st transfer," "2nd transfer" and "3rd transfer;" each of the card portions 7 and 8 being also provided with blanks to receive the signature and address of the buyer and also the signatures of the registered owner and of the legal owner all of which are to be indorsed on this portion of the certificate at the time of executing the transfer of ownership in the vehicle.

The portions 9, 10 and 11 constitute detachable coupons of transfer and while here shown as three in number may be of any suitable number and preferably correspond to the number of transfers indicated on the indorsement card portions 7 and 8; these coupons being numbered consecutively from the lowermost to the uppermost and here designated as transfer coupons #1, #2 and #3. Each of these separable coupons bear the license number carried by the identification card and corresponding to the vehicle license plates, and carry a printed form to be signed by the registered owner of the vehicle certifying transfer of his ownership and also carries a printed form to be signed by the purchaser certifying his purchase of the vehicle. The transfer coupons are provided with a space to receive the date of transfer. The transfer coupons are designed to be detached and forwarded to the State registration bureau on date of transfer together with transfer fee called for by the State and for this purpose are provided with the address of the registration bureau.

In carrying my invention into effect a State registration bureau is supplied with a number of the certificates corresponding in number to the license plates to be issued to the vehicle owners during the year. On an application to be filed for original registration of a motor vehicle the card 6 of the certificate is filled out with the required data which is duplicated at the same time on the coupon 5, which coupon is detached and filed for record with the State registration bureau. The remainder of the certificate is delivered to the registered owner and is posted in the vehicle as before described.

In event the registered owner, as indicated on the certificate, transfers his ownership therein to another, designated as the purchaser, the transfer coupon 11 is signed by the registered owner whose signature must agree with his signature as inscribed on the card 6. The transfer coupon 11 is also signed by the purchaser whereupon it is forwarded to the State registration bureau together with the required fee; the coupon setting forth the name and address of the new purchaser for registration. The new purchaser at the time of executing the coupon also affixes his signature and address on line 1 under "1st transfer" of the indorsement portion 7 of the certificate, and the signatures of the registered and legal owner are also indorsed on the indorsement portion 7 and must agree with the signature on the card 6, thus proving an absolute clear title. In like manner subsequent transfers are made on the successive coupons and indicated by indorsements on the portion 8 of the certificate; the signature of the transferor, however, on the coupons 10 and 9 and on the indorsement portion 8 then agreeing with his previous signature on the indorsement portions.

From the foregoing it will be seen that the card portion 6 of the certificate will serve as a means of identification of a motor vehicle by various data pertaining thereto, as an identification of the registered owner whose name and signature appear thereon, and as a certificate of license; that the detachable coupon 5 will serve as a duplicate record for filing in the State registration bureau; that the card portions 7 and 8 serve to indicate joint indorsement of transfer, certifies recordation of transfer, identifies new purchaser by signature and address, identifies the registered and the legal owner by signature, acts to release old owner of future liability, serves as means of identification of rightful owner at all times, and indicates date of transfer; and the corresponding coupons 9, 10 and 11 serve as acknowledgements of transfer and of purchase, identify purchaser by signature and address, and acts as a notice of transfer and as a letter of transmittal of transfer fee to the State registration bureau.

As a means for indicating on the certificate judgments or penalties imposed on the owner or driver of a vehicle identified by the certificate for the violation of traffic ordinances, the reverse face of the certificate is provided with blanks to be filled in to indicate the ordinance violated, the date, place, and court of trial, the name of person tried and the character of the judgment or penalty imposed and the amount of fine. The reverse face of the certificate may be further employed to display ordinances pertaining to motor traffic regulations and other data of importance to the vehicle owner.

While I have shown and described a specific embodiment of my invention, I do not limit myself to the exact details of construction or wording shown, but may resort to such changes and modifications as occasion may require by the different State motor vehicle registration bureaus, without departing from the spirit of the invention, and as may come within the scope of the appended claims.

I claim:

1. A certificate of the character described comprising a single sheet, an identification card portion 6, an indorsement of transfer portion 7, and a detachable transfer coupon 11 substantially as set forth.

2. A certificate of the character described, comprising an identification card portion 6 having appropriately designated spaces to receive identifying data, a detachable coupon 5 on said card portion having appropriately designated spaces to receive duplication of the identification data, an appropriately designated indorsement of transfer portion 7 on said identification portion having blanks to receive endorsements, and a detachable transfer coupon 11 having data designating transfer of ownership.

3. A certificate of the character described comprising a combined license and identification card 6, a detachable recordation coupon 5, an indorsement of transfer card, and detachable transfer coupons 9, 10 and 11, said cards and coupons being connected together to form a strip.

4. A certificate of the character described comprising a combined license and identification card, having an appropriately designated space to receive the signature of the person to whom the certificate is issued, an indorsement of transfer portion having an appropriately designated space to receive the signature of the transferor and the transferee, and a detachable transfer coupon having appropriately designated spaces for the signatures of the transferor and the transferee, said card, indorsement of transfer portion and transfer coupons being connected together.

5. A certificate of the character described comprising a combined license and identification card having appropriately designated blanks to receive data of license and identification, a detachable recordation coupon for receiving a duplicate of the data on the first named card, said license and identification card being provided with an appropriately designated space to receive the signature of the person to whom the card is issued, an indorsement of transfer portion having an appropriately designated space to receive the signature of the transferor and the transferee, and a detachable transfer coupon having appropriately designated spaces for the signature of the transferor and the transferee; said cards, indorsement of transfer portion, and coupons being connected together.

6. A certificate of the character described comprising a combined license and identification card having appropriately designated spaces and data for license and identification purposes, having an appropriately designated space to receive the signature of the person to whom the certificate is issued, an indorsement of transfer portion having an appropriately designated space to receive the signature of the transferor and the transferee, and a detachable transfer coupon having appropriately designated spaces for the signature of the transferor and the transferee, the aforesaid card, portion, and coupon being formed in a single sheet of material of such character as to show evidence of alterations.

7. A certificate of the character described comprising in a single sheet an identification card portion 6, an indorsement of transfer portion 7 and 8, and detachable transfer coupons 9, 10 and 11, said certificate embodying the aforesaid portions being formed of sheet material of such character as to show evidence of alterations.

8. A certificate of the character described, comprising a strip, a pair of fields at one end of said strip, a scored line separating said fields along which the end field may be detached, appropriately designated spaces on the reverse face of the end field to receive data relating to the identification of a vehicle, corresponding appropriately designated spaces on the obverse face of the adjacent field, appropriately designated spaces on the obverse face of the last named field to receive data relating to the identification of ownership of a vehicle, a pair of joined fields one of which lies adjacent the last named field, a series of appropriately designated spaces on said joined fields to receive indorsements of transfers, a series of separable coupons adjoining the end field of the joined fields, and appropriately designated blanks on said coupons to receive data evidencing transfer of ownership of a vehicle

OSCAR F. COLEMAN